US008938791B2

United States Patent
O'Donnell et al.

(10) Patent No.: US 8,938,791 B2
(45) Date of Patent: Jan. 20, 2015

(54) SYSTEM AND METHOD TO CONTROL DISPLAY OF A REALM NAME

(75) Inventors: William J. O'Donnell, Fichburg, WI (US); Paul William Bennett, Austin, TX (US); Elisa Ferracane, Austin, TX (US); Ajay Reddy Karkala, Austin, TX (US); Ut Van Le, Austin, TX (US); Michael Craig Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 13/157,633

(22) Filed: Jun. 10, 2011

(65) Prior Publication Data

US 2012/0317633 A1 Dec. 13, 2012

(51) Int. Cl.
*G06F 21/00* (2013.01)
*G06F 21/84* (2013.01)
*G06F 21/30* (2013.01)
*G06F 21/60* (2013.01)
*H04L 29/06* (2006.01)

(52) U.S. Cl.
CPC ............. *G06F 21/84* (2013.01); *G06F 21/305* (2013.01); *G06F 21/604* (2013.01); *H04L 63/0807* (2013.01); *H04L 63/0815* (2013.01); *H04L 63/101* (2013.01); *G06F 2221/2115* (2013.01); *G06F 2221/2117* (2013.01); *G06F 2221/2119* (2013.01)
USPC .......................................................... 726/10

(58) Field of Classification Search
USPC .......................................................... 726/10
See application file for complete search history.

(56) References Cited

U.S. PATENT DOCUMENTS

| 7,367,044 B2 | 4/2008 | Fowler et al. | |
| 7,404,203 B2 | 7/2008 | Ng | |
| 7,650,627 B1 | 1/2010 | Stancheva et al. | |
| 7,788,489 B2 | 8/2010 | Ng | |
| 2006/0021016 A1* | 1/2006 | Birk et al. | 726/10 |
| 2006/0075473 A1* | 4/2006 | Moreh et al. | 726/5 |

OTHER PUBLICATIONS

Trostle, J. et al, "Implementation of Crossrealm Referral Handling in the MIT Kerberos Client," 2001.
Salsano. S. et al, "Extending SIP Authentication to exploit user credentials stored in existing authentication Databases," 2008.
Java Developer's Cookbook, Apr. 2009.
Saldhana, A. et al, "Security with JBoss Application Server 6," 2009-2010.

* cited by examiner

*Primary Examiner* — Tu Nguyen
(74) *Attorney, Agent, or Firm* — Jeffrey S. LaBaw; David H. Judson

(57) ABSTRACT

A method for dynamically assigning a displayable realm name begins upon receipt of an authentication request to an application, such as a web application, being executed by an application server. In response, a determination is made whether an application realm name has been set in a configuration file associated with the application. If not, a custom display property is then evaluated. If the custom display property is set true, a realm name associated with an active authentication mechanism is retrieved and provided for display in an authentication panel. If the custom display property is set false, a default string is provided for display in the authentication panel. In this manner, an application server administrator can control what realm name is displayed to an end user in the event an application developer has not specified the realm name in the application configuration.

25 Claims, 5 Drawing Sheets

US 8,938,791 B2

SYSTEM AND METHOD TO CONTROL DISPLAY OF A REALM NAME

BACKGROUND OF THE INVENTION

1. Technical Field

This disclosure relates generally to web application security and in particular to a method and system for allowing control over a displayable realm name associated with a security domain.

2. Background of the Related Art

In a web based application environment, "realms" may protect resources, such as files, directories, images, application resources, or the like. Typically, realms assign certain systems to trusted groups of systems using a web server, or they protect and control access using a proxy server.

The Java JEE standard supports the notion of declaring security constraints for Web-based applications using XML (outside of the application code). In addition, JEE standards put the control of security into a container, which removes the control of security from the application developer. Application developers are looking for an easier ways to declare these constraints during the development process. In addition, while developing these applications, developers need a better way to control the authentication process. To this end, the Java JEE Servlet 3.0 specification (Java specification: JSR315) resolves these issues using annotations and new Servlet methods. One specific enhancement in the specification allows for the developer to control the "realm" name that is displayed to the client during basic authentication (to help the user understand specifically what they are logging into). As is well-known, basic authentication (BA) is a standard HTTP-based method for providing a username and password to an authentication mechanism. Under the JEE standard, the developer can control the displayed realm name calls by specifying the name within the Servlet or providing an indication to leave the realm name blank.

A problem arises, however, if a realm name is not defined by an application developer. Most application developers do not define the realm name. The JEE specification does not specify any mechanism to allow the administrator to specify a default realm name in this situation.

BRIEF SUMMARY

According to this disclosure, a method for dynamically assigning a displayable realm name begins upon receipt of an authentication request to an application, such as a web application, executing on an application server. In response, a determination is made whether an application realm name has been set in a configuration file associated with the application. If not, a custom display property is then evaluated. If the custom display property is set true, a realm name associated with an active authentication mechanism is retrieved and provided for display in an authentication panel. If the custom display property is set false, a default string is provided for display in the authentication panel. In this manner, an application server administrator can control what realm name is displayed to an end user in the event an application developer has not specified the realm name in the application configuration.

In an alternative embodiment, the above-described method for dynamically determining a displayable realm name is performed in an apparatus. The apparatus carries out the method during an authentication with a user operating a client browser.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
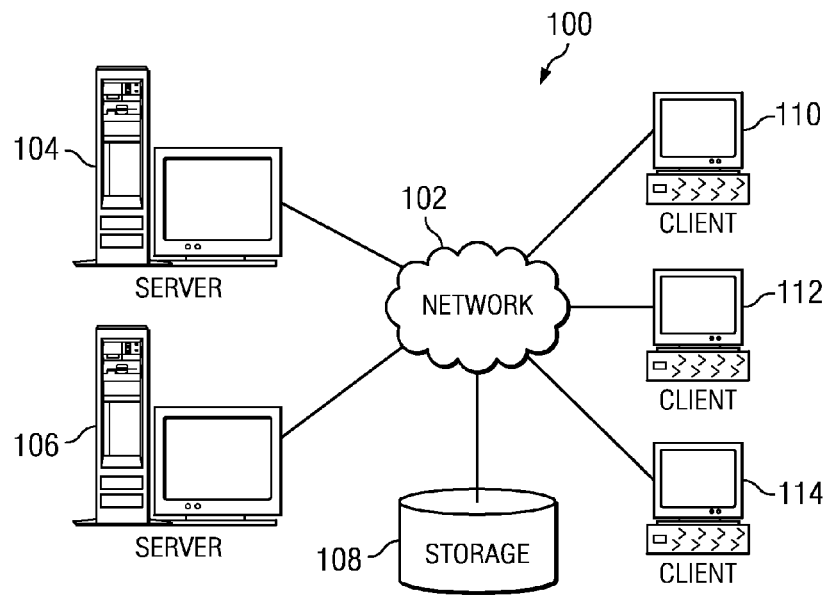
FIG. 1 depicts an exemplary block diagram of a distributed data processing environment in which exemplary aspects of the illustrative embodiments may be implemented.
Figure 2:
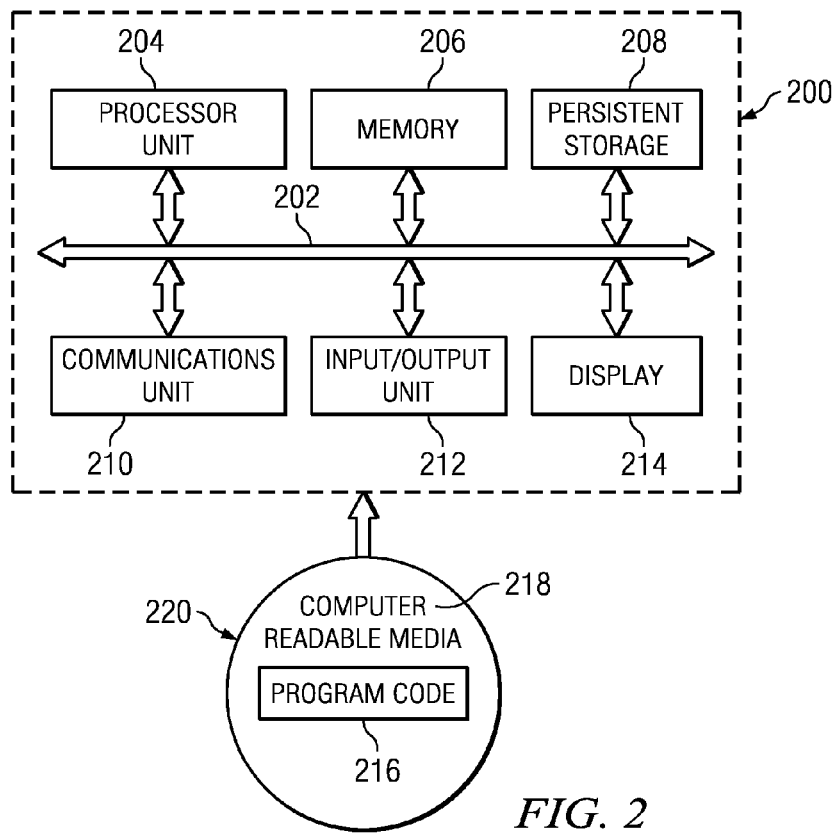
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a web based application environment, "realms" may protect resources like files, directories, images, application resources, or the like. Typically, realms assign certain systems to trusted groups of systems using a web server, or they may protect and control access using a proxy server. When accessed using an application client, such as a web browser using Hypertext Transfer Protocol (HTTP), web servers return a HTTP response code of "401" if these resources are not accessed using proper authentication information; similarly, proxy servers return an HTTP response code of "407" if the resources are not accessed using proper authentication information. Along with a "401" or "407" response code, the web server or the proxy server, as the case may be, responds with certain other information, such as the name associated with the protection area, the host name, and/or IP address of the machine that is trying to protect these resources, or other optional entities. This information may be called the realm or the authentication mechanism. This information may also be called a web server realm (if web server is protecting the resource) or proxy server realm (if a proxy server is involved in the protection). Realms may use a variety of authentication mechanisms, including but not limited to, NT LAN Manager (NTLM), Kerberos™, Integrated Windows Authentication (IWA), Simple and Protected GSSAPI Negotiation Mechanism (SPNEGO), or the like.

Figure 3:
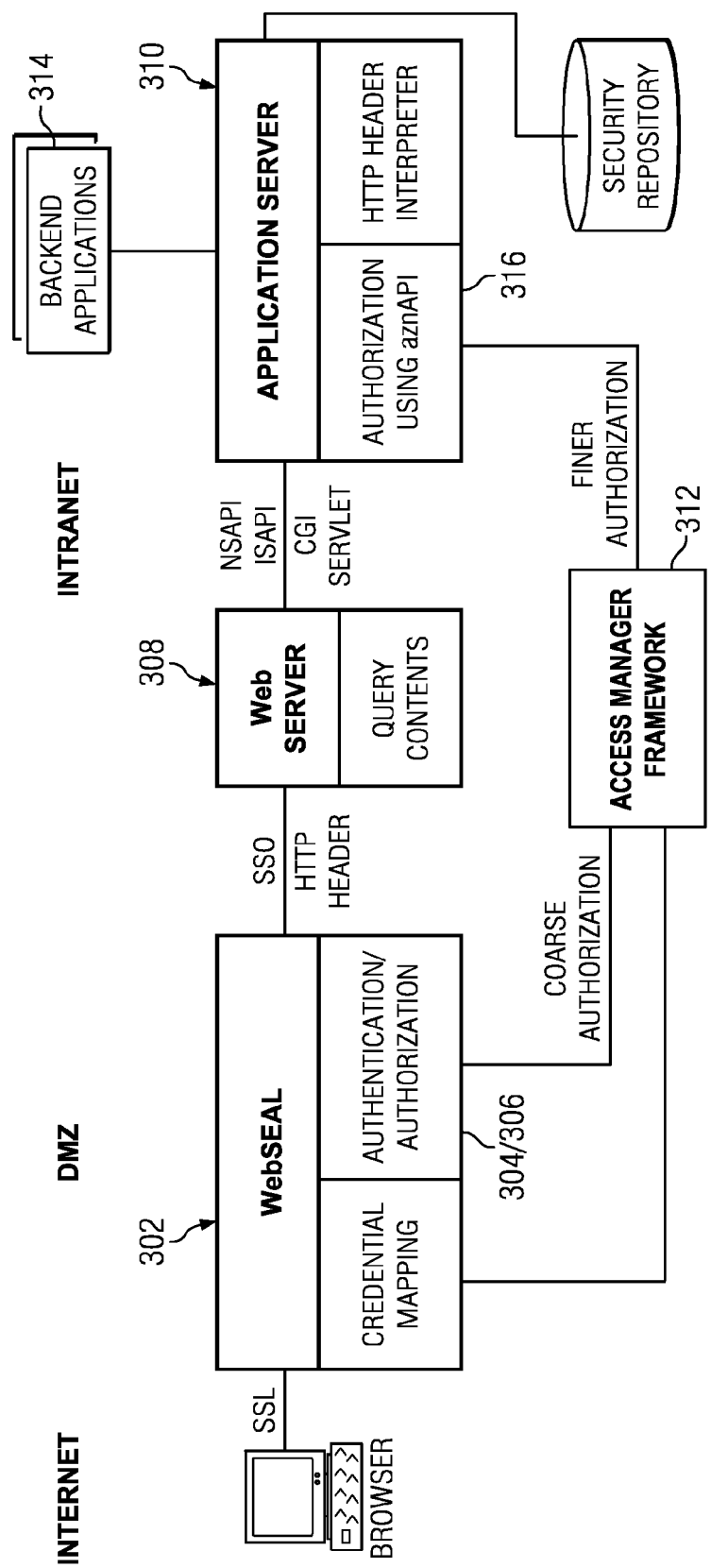
FIG. 3 illustrates a Web portal having an access management framework in which the subject disclosure may be implemented.

By way of further background, a web-based application environment such as described above typically includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the disclosed subject matter. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. This component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

In a representative implementation, IBM WebSphere® Application Server provides embedded IBM® Tivoli® Access Manager client technology to secure WebSphere Application Server-managed resources. WebSphere Application Server supports the Java Authorization Contract for Containers (JACC) specification. JACC details the contract requirements for Java EE containers and authorization providers. With this contract, authorization providers perform the access decisions for resources in Java EE application servers such as WebSphere Application Server. The Tivoli Access Manager security utility that is embedded within WebSphere Application Server is JACC-compliant and is used to add security policy information when applications are deployed, and to authorize access to WebSphere Application Server-secured resources. When applications are deployed, the embedded Tivoli Access Manager client takes any policy and or user and role information that is stored (within an application deployment descriptor or using annotations) and stores it within the Tivoli Access Manager Policy Server. The Tivoli Access Manager JACC provider is also called when a user requests access to a resource that is managed by WebSphere Application Server. An "annotation" is a programming mechanism and, in particular, a standard way to include supported security behaviors while allowing source code and configuration files to be generated automatically. In Java™ Platform, Enterprise Edition (Java EE) 5 and above, security roles and policies can be defined using annotations, as well as within a deployment descriptor. During the installation of the application, the security policies and roles defined using annotations are merged with the security policies and roles defined within the deployment descriptor.

Realm Name Display Control

With the above as background, the subject matter of this disclosure is now described.

The techniques herein preferably are implemented in an application server that supports security updates as defined in the Java™ Servlet 3.0 specification (JSR315). One such security update provides for the dynamic updating of the servlet security configuration.

As noted above, the application server provides annotation support for servlets. With this support, an application developer can declare security constraints using annotations as an alternative to declaring them as part of the web.xml file (the technique used prior to Java Servlet 3.0). The web.xml file continues to function and overrides any conflicts defined as annotations. According to this disclosure, the application server is enhanced to provide a configuration option (e.g., at a security configuration layer) to control the realm name that gets displayed when a user performs basic authentication against a server. In this manner, an administrator or other permitted entity (including, without limitation, a person, or a programmatic entity) has the ability to define a realm name that is used when no realm name is specified by the application developer. This technique is advantageous, as typically developers do not specify the realm name in their web configuration (i.e. the realm is normally left undefined).

According to a preferred embodiment, a custom display property is defined which specifies whether an HTTP basic authentication login window displays the realm name that is defined in the application web.xml file. The setting of the display property controls whether an administrator-specified default realm name is displayed. In particular, according to one embodiment, if the realm name is defined in the web configuration, then that name is the realm name displayed. If, however, the realm name is not defined (e.g., by the application developer), the display property is checked. If the display property is set, the realm name is retrieved from the configured authentication mechanism and displayed. If the display property is not set, then the realm name displayed is a "default" realm. As an alternative, the administrator (or other permitted entity) may have the option to override any realm name specified in the web application.

In one embodiment, the application server is IBM WebSphere Application Server v8. This application server includes a configuration service that includes a web application console that displays one or more pages to facilitate the configuration operation. Using the technique described herein, a "security.displayRealm" property is set to specify whether the HTTP basic authentication login window displays the realm name that is defined in the application web.xml file. If the realm name is not defined in the web.xml file, one of the following occurs: (i) if the property is set to false (the default), the WebSphere realm name display is "Default Realm"; (ii) If the property is set to true, the WebSphere realm name display is the user registry realm name for the LTPA authentication mechanism or the Kerberos realm name for the Kerberos authentication mechanism.

Figure 4:
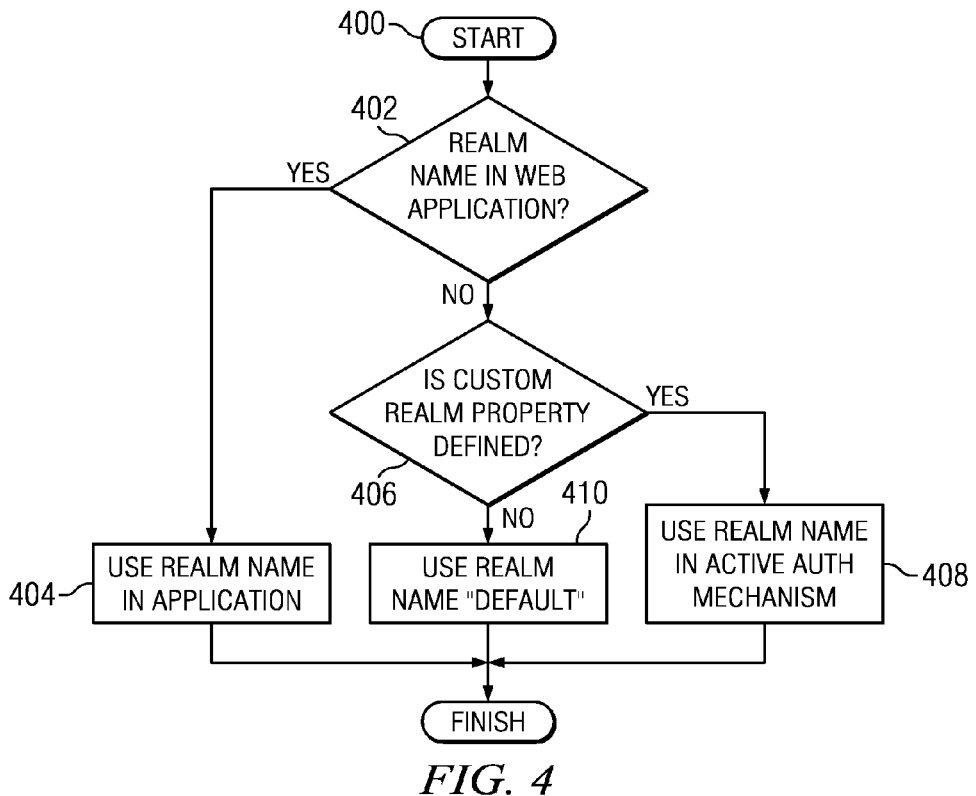
FIG. 4 is a simplified process flow diagram illustrating how an application server configured according to this disclosure determines which realm name to display during a basic authentication.

FIG. 4 illustrates the process diagrammatically. The implementation starts at step 400. At step 402, the application server checks a web configuration file (e.g., web.xml) to determine if the realm name is defined. If the outcome of the test at step 402 indicates that the realm name is defined in the web configuration file, the routine branches to step 404 in which the configuration-defined realm name is used (displayed) unconditionally. The routine then terminates. If, however, the outcome of the test at step 402 indicates that the realm name is not defined in the web configuration file (which is the typical scenario, as application developers typically do not define it), the routine continues at step 406. At step 406, the application server checks to determine if the display property (e.g., " . . . security.displayRealm") is set. If the outcome of the test at step 406 is positive (i.e., if the custom display property is set), the routine branches to step 408. Step 408 retrieves the realm name from an authentication mechanism that is then active (and being used for the basic authentication) and displays it. Thus, for example, if Kerberos is being used for the authentication mechanism, the Kerberos realm name is used; if Lightweight Third Party Authentication (LTPA) is being used for the authentication, then the registry realm name is used. After step 408, the routine terminates. If, however, the outcome of the test at step 406 is negative (i.e., if the custom display property is not set), the routine continues at step 410. At step 410, the displayed realm name is a predetermined string, such as "default realm." This completes the processing.

Figure 5:
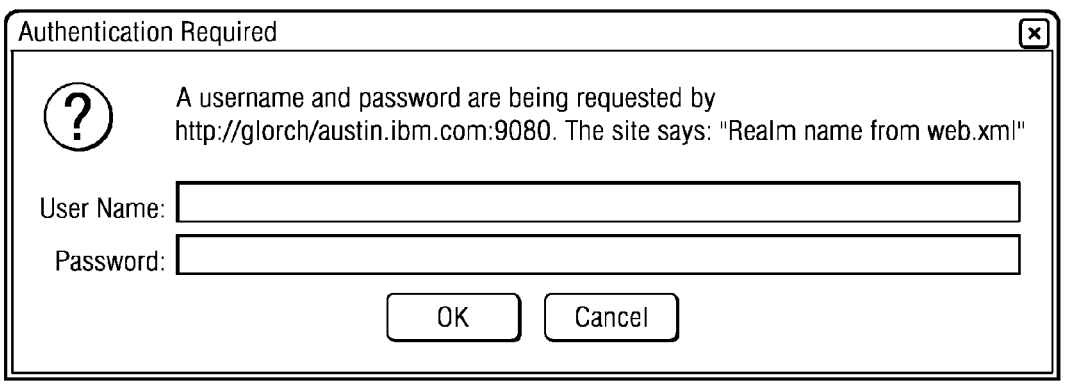
FIG. 5 illustrates a representative basic authentication display window when the application server determines that the realm name from the web application is to be displayed.

FIG. 5 illustrates a representative basic authentication display window when the outcome of the test at step 402 (in FIG. 4) indicates that the realm name from the web application is to be used. As seen, the basic authentication panel indicates that a "username and password are being requested." In this example, because the realm name is specified in the web application, the "Realm name from web.xml" is displayed. This is the situation in which the realm name defined in the web application (web.xml) overrides the custom property.

Figure 6:
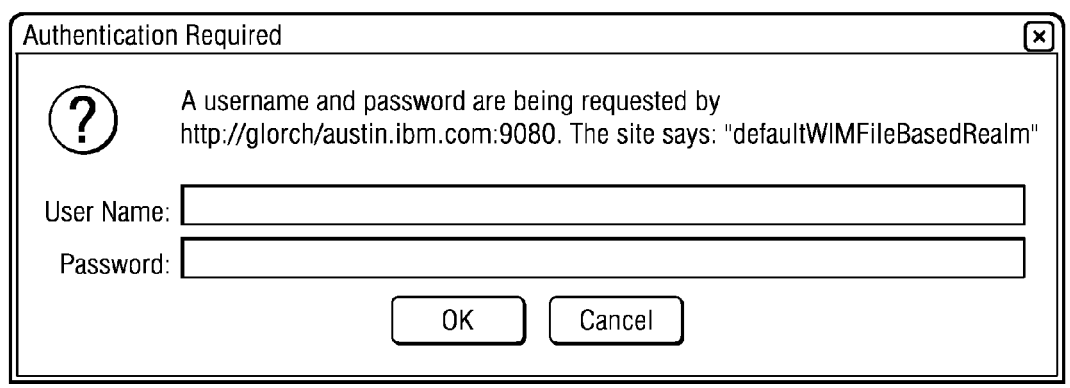
FIG. 6 illustrates a representative basic authentication display window when the application server uses a custom display property setting to cause display of a realm name associated with an active authentication mechanism.

FIG. 6 illustrates a representative basic authentication display window when the outcome of the test at step 406 (in FIG. 4) indicates that the realm name is not specified in the web application but the custom display property is set. As seen, the basic authentication panel indicates once again that a "username and password are being requested" but, in this example, the "defaultWIMFileBasedRealm" is displayed. As noted above, in this scenario, the realm name from the active authentication mechanism is retrieved and provided for display within the authentication panel. This is step 408 in FIG. 4, as has been described, which is the situation when the custom property is set "true."

Figure 7:
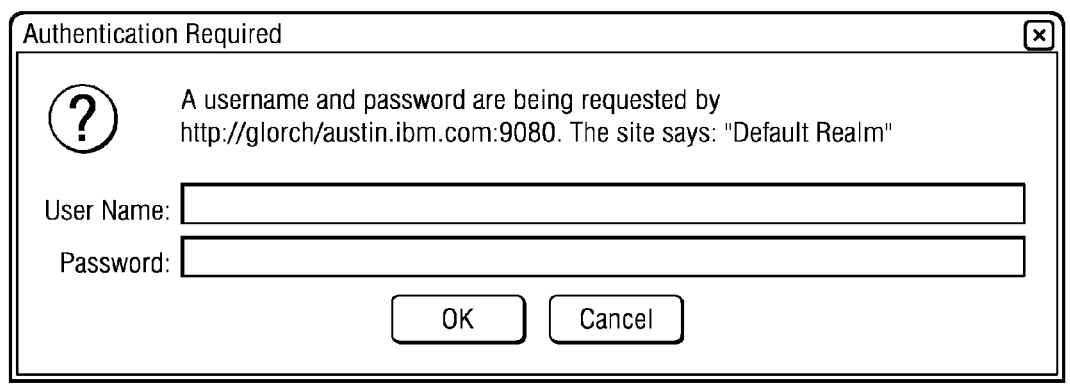
FIG. 7 illustrates a representative basic authentication display window when the application server determines that the custom display property is not set, thereby causing display of a default string.

FIG. 7 illustrates a representative basic authentication display window when the outcome of the test at step 406 (in FIG. 4) indicates that the realm name is not specified in the web application and the custom display property is not set. As seen, the basic authentication panel indicates once again that a "username and password are being requested" but, in this example, the "Default Realm" string is displayed. This is step 410 in FIG. 4, which is the situation when the custom property is not defined (using Realm Name "default" path, default value of false).

Figure 8:
FIG. 8 illustrates a representative administrative console interface by which an administrator sets the security.displayRealm custom property according to this disclosure.

FIG. 8 illustrates a representative administrative console interface by which an administrator sets the security.displayRealm custom property. By selecting the configuration option, a display panel is exposed to the administrator. This panel provides the configuration options. Although this technique is a preferred way to set the display property, other techniques (such as programmatic methods) may be used. In addition, the source of the configured realm name may come from other locations, such as a server-level configuration. Also, realm name display technique is not limited from use with basic authentication, as the technique may be used whenever realm names are specified for display.

While the disclosed technique has been described in the context of JEE Servlet 3.0 specification, this is not a limitation. The technique may be used for any application that requires a login.

The subject matter described herein has many advantages. It enables an administrator or other permitted entity to control the displayable realm name that is exposed to an end user seeking to authenticate to the realm. It addresses and solves the problem of what to do when a realm name is not defined by the application developer, which is the usual scenario. Many application server customers believe that application developer teams are responsible for building the application, while administrators are responsible for controlling security characteristics thereof; the disclosed technique fosters a level of checks and balances to ensure that end users receive useful information The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The secure web server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the application server configuration and display control components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the realm name display control framework described above.

The realm name display determination and related processing functionality provided by the application server may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, Chrome or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

Having described our invention, what we now claim is as follows:

1. A method for dynamically assigning a displayable realm name, comprising:
   responsive to an authentication request, determining, by a server executing on a hardware element, whether an application realm name has been set;
   when the application realm name has not been set, determining whether a realm name display property has been set;
   when the realm name display property has been set, retrieving a realm name associated with an active authentication mechanism being used to respond to the authentication request; and
   when the display property has not been set, providing a default string for display as the realm name.

2. The method as described in claim 1 wherein determination of whether the application realm name has been set examines an application configuration file.

3. The method as described in claim 2 further including displaying the application realm name when the application realm name is located in the application configuration file.

4. The method as described in claim 1 further including displaying the realm name associated with the active authentication mechanism when the realm name display property is set.

5. The method as described in claim 1 wherein the active authentication mechanism is Kerberos and the realm name associated with the active authentication mechanism is a Kerberos realm name.

6. The method as described in claim 1 wherein the active authentication mechanism is Lightweight Third Party Authentication (LTPA) and the realm name associated with the active authentication mechanism is a registry realm name.

7. The method as described in claim 1 wherein the authentication request is a basic authentication request.

8. The method as described in claim 1 further including setting the realm name display property.

9. Apparatus, comprising:
   a processor;
   computer memory holding computer program instructions executed by the processor for dynamically assigning a displayable realm name, the computer program instructions comprising:
      program code responsive to an authentication request, determining whether an application realm name has been set;
      program code operative when the application realm name has not been set to determine whether a realm name display property has been set;

program code operative when the realm name display property has been set to retrieve a realm name associated with an active authentication mechanism being used to respond to the authentication request; and program code operative when the display property has not been set to provide a default string for display as the realm name.

10. The apparatus as described in claim 9 wherein determination of whether the application realm name has been set examines an application configuration file.

11. The apparatus as described in claim 10 wherein the computer program instructions further includes program code displays the application realm name when the application realm name is located in the application configuration file.

12. The apparatus as described in claim 9 wherein the computer program instructions further includes program code displays the realm name associated with the active authentication mechanism when the realm name display property is set.

13. The apparatus as described in claim 9 wherein the active authentication mechanism is Kerberos and the realm name associated with the active authentication mechanism is a Kerberos realm name.

14. The apparatus as described in claim 9 wherein the active authentication mechanism is Lightweight Third Party Authentication (LTPA) and the realm name associated with the active authentication mechanism is a registry realm name.

15. The apparatus as described in claim 9 wherein the authentication request is a basic authentication request.

16. The apparatus as described in claim 9 wherein the computer program instructions further includes program code sets the realm name display property.

17. A computer program product in a non-transitory computer readable medium for use in a data processing system, the computer program product holding computer program instructions which, when executed by the data processing system, perform a method for dynamically assigning a displayable realm name, the method comprising:

responsive to an authentication request, determining whether an application realm name has been set;

when the application realm name has not been set, determining whether a realm name display property has been set;

when the realm name display property has been set, retrieving a realm name associated with an active authentication mechanism being used to respond to the authentication request; and when the display property has not been set, providing a default string for display as the realm name.

18. The computer program product as described in claim 17 wherein determination of whether the application realm name has been set examines an application configuration file.

19. The computer program product as described in claim 18 wherein the method further includes displaying the application realm name when the application realm name is located in the application configuration file.

20. The computer program product as described in claim 17 wherein the method further includes displaying the realm name associated with the active authentication mechanism when the realm name display property is set.

21. The computer program product as described in claim 17 wherein the active authentication mechanism is Kerberos and the realm name associated with the active authentication mechanism is a Kerberos realm name.

22. The computer program product as described in claim 17 wherein the active authentication mechanism is Lightweight Third Party Authentication (LTPA) and the realm name associated with the active authentication mechanism is a registry realm name.

23. The computer program product as described in claim 17 wherein the authentication request is a basic authentication request.

24. The computer program product as described in claim 17 wherein the method further includes setting the realm name display property.

25. Apparatus, comprising:

a processor;

computer memory holding computer program instructions that when executed by the processor during an authentication (i) dynamically determines a displayable realm name by examining a custom display property, and (ii) (a) when the custom display property is set to a first value, provides for display a first realm name, and (ii)(b) when the custom display property is set to a second value, provides for display a second realm name;

wherein the first realm name is associated with an active authentication mechanism, and the second realm name is a default string.

\* \* \* \* \*